United States Patent
Kirby et al.

(10) Patent No.: US 9,749,367 B1
(45) Date of Patent: Aug. 29, 2017

(54) VIRTUALIZATION OF PHYSICAL SPACES FOR ONLINE MEETINGS

(71) Applicant: Cisco Technology, Inc., San Jose, CA (US)

(72) Inventors: Shaun Kirby, Pasadena, CA (US); Bharat Popat, Livermore, CA (US); Kristopher Linquist, Milpitas, CA (US); Paul Grey, Sheffield (GB); David Evans, Los Altos Hills, CA (US); Rachael McBrearty, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 662 days.

(21) Appl. No.: 13/788,103

(22) Filed: Mar. 7, 2013

(51) Int. Cl.
*G06F 3/048* (2013.01)
*H04L 29/06* (2006.01)

(52) U.S. Cl.
CPC .................................. *H04L 65/403* (2013.01)

(58) Field of Classification Search
None
See application file for complete search history.

(56) References Cited

U.S. PATENT DOCUMENTS

| | | | |
|---|---|---|---|
| 7,461,347 B2 | 12/2008 | Zhu et al. | |
| 7,499,535 B1* | 3/2009 | Ivory | H04M 3/42374 379/201.06 |
| 8,245,141 B1 | 8/2012 | Fuller et al. | |
| 8,312,081 B2 | 11/2012 | Yuan et al. | |
| 2007/0011273 A1* | 1/2007 | Greenstein | G06T 19/00 709/217 |
| 2010/0037151 A1* | 2/2010 | Ackerman et al. | 715/753 |
| 2010/0332980 A1* | 12/2010 | Sun et al. | 715/706 |
| 2012/0204120 A1* | 8/2012 | Lefar | G06Q 10/109 715/757 |

OTHER PUBLICATIONS

Mark Billinghurst, et al., "Collaborative Mixed Reality", IN Proceedings of the First International Symposium on Mixed Reality (ISMR '99), Mixed Reality—Merging Real and Virtual Worlds, Berlin: Springer Verlag, (16 pages).

(Continued)

*Primary Examiner* — William Trapanese
(74) *Attorney, Agent, or Firm* — Edell, Shapiro & Finnan, LLC

(57) ABSTRACT

An online collaborative meeting is established, utilizing at least one meeting server, where the meeting includes a plurality of meeting endpoints that communicate with each other via the meeting server. The meeting server establishes a plurality of electronic work spaces that are commonly assigned to each meeting endpoint, where each work space for each meeting endpoint provides different content and each work space that is common to each meeting endpoint provides the same content for real-time display. During the online collaborative meeting, the meeting server facilitates modification to content at any of the work spaces by any meeting endpoint, where modification to content at a work space by one meeting endpoint results in a real-time distribution and display at all other meeting endpoints of the modification to the content at the work space.

19 Claims, 9 Drawing Sheets

(56) References Cited

OTHER PUBLICATIONS

Maribeth Back, et al., "The Virtual Chocolate Factory: Building a Real World Mixed-Reality System for Industrial Collaboration and Control", 978-1-4244-7493-6/10 2010 IEEE ICME 2010, (pp. 1160-1165).

Wayne Piekarski, et al., "Integrating Virtual and Augmented Realities in an Outdoor Application", Advanced Computing Research Centre, University of South Australia, Mawson Lakes, SA, Australia, Augmented Reality, 1999 (IWAR '99) Proceedings, 2nd IEEE and ACM International Workshop on Augmented Reality, (10 pages).

* cited by examiner

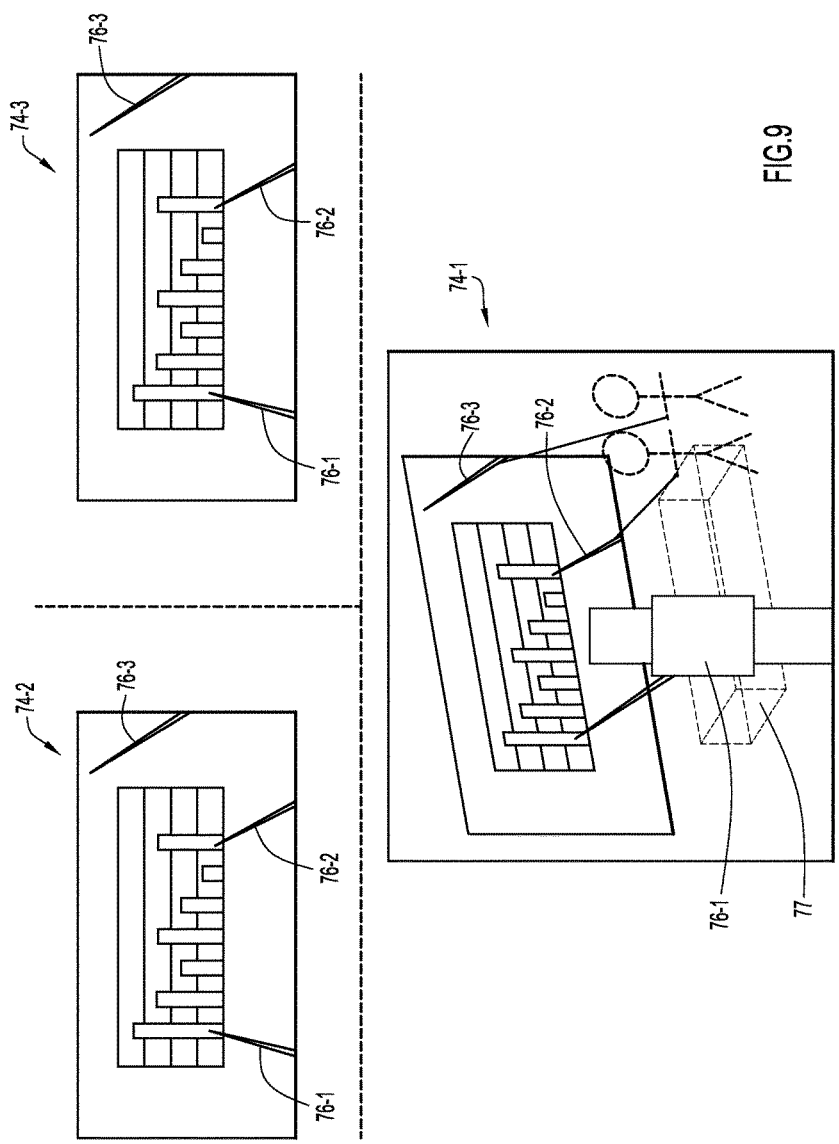

VIRTUALIZATION OF PHYSICAL SPACES FOR ONLINE MEETINGS

TECHNICAL FIELD

The present disclosure relates to online meetings between different endpoint locations with a plurality of work spaces.

BACKGROUND

Online meeting platforms, such as web conferencing systems and telepresence systems utilizing immersive video are changing the way people work, enhancing work productivity and accelerating innovation to allow people from multiple locations to work together while minimizing costs associated with requiring people to meet in one room or at one physical location. However, organizations across various industries continue to struggle with replicating the in-person experience for an online meeting in which people are located at various different physical locations. This is particularly the case where multiple forms of content need to be shared, and where the meeting would benefit from multiple people providing input for the creation or editing of the content.

In order to facilitate a meeting that allows manipulation, co-creation and co-editing of various types of content across multiple work spaces, such as white boards, post-it note walls, flip charts and/or any other types of collaborative activity works surfaces, people often travel to convene at a single physical location. Graphic recorders and facilitators may be used to capture and record all of the content being developed at the meeting, and the content must then be compiled into a work report which may be generated a week or longer after the meeting occurs.

BRIEF DESCRIPTION OF THE DRAWINGS

FIG. 9 is an example embodiment depicting different work spaces for physical meeting rooms as well as a display for a virtual meeting room in which avatars are utilized for the different meeting endpoints to collaborate in the generation and editing of content during a collaborative meeting session supported by the system of FIG. 1.

DESCRIPTION OF EXAMPLE EMBODIMENTS

Overview

Figure 1:
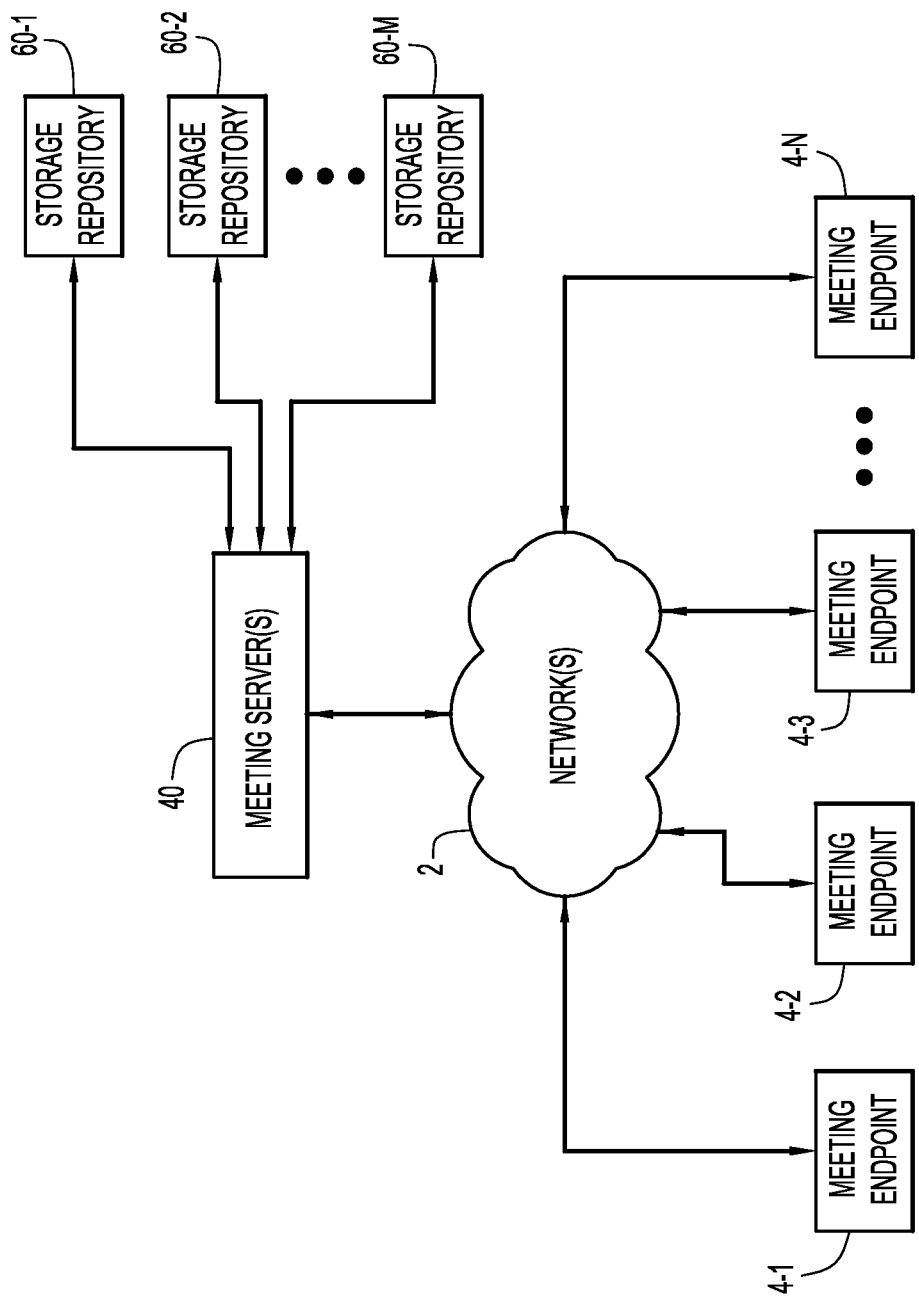
FIG. 1 is a schematic block diagram of an example system that supports an online collaborative meeting platform between meeting endpoints which is hosted by one or more meeting servers.

Techniques are described herein for establishing, via at least one meeting server, an online collaborative meeting comprising a plurality of meeting endpoints that communicate with each other via the at least one meeting server. The at least one meeting server establishes a plurality of electronic work spaces that are commonly assigned to each meeting endpoint, where each work space for each meeting endpoint provides different content and each work space that is common to each meeting endpoint provides the same content for real-time display. The at least one meeting server also facilitates, during the online collaborative meeting, modification to content at any of the work spaces by any meeting endpoint, where modification to content at a work space by one meeting endpoint results in a real-time distribution and display at all other meeting endpoints of the modification to the content at the work space.

Example Embodiments

Techniques are described herein for facilitating online collaborative meetings in which participants at different meeting endpoints can collaborate in the sharing, generation, and editing of content via multiple work spaces in real-time during such meetings. This is accomplished by a meeting server initially establishing electronic work spaces that are common to all meeting endpoints and providing the same or identical content to each common work space for each meeting endpoint. Meeting endpoints are then enabled with the ability to share content at any work space or manipulate, modify or change shared content at any such work space, where any changes made to content at a work space by any meeting endpoint is displayed at the common work space in real-time for all other meeting endpoints. This enhances the collaborative experience for participants at different physical locations.

As used herein, the term "real-time" refers to a very short time period (e.g., within one or more seconds or within one or more fractions of a second) in which any change in content associated with any work space that may result from the actions at any meeting endpoint results in the changed content being displayed and accessible to other meeting endpoints at the common work space. Any suitable data delivery format (e.g., extensible message and presence protocol or XMPP format) can be provided by the collaborative meeting platform to facilitate real-time exchange of content for work spaces as well as any other types of communications or content within online collaborative meeting sessions as described herein.

The term "work space" or "electronic work space", as described herein, refers to defined areas or spaces within a physical meeting room or within a virtual meeting room in which content can be shared, viewed and edited by participants at different endpoint locations. In particular, a work space can comprise any one or more electronic devices in a physical meeting room or any defined area within the display of a virtual meeting room that facilitates display and editing of content by different meeting endpoints during an online collaborative meeting session. Work spaces as described herein can be configured to represent two-dimensional views of content and also three-dimensional views of content.

The meeting endpoints can be meeting rooms (e.g., telepresence rooms) that include a plurality of work spaces (e.g., white boards, display panels that display content that is generated/edited from one or more computing devices, video displays of presenters for the meeting, etc.) and in which certain participants may meet in order to engage in the collaborative meeting with other remote participants. Meeting endpoints can also be remote participants that engage in a collaborative meeting session with a computing device (e.g., a desktop computing device, a laptop, a tablet, etc.). In other words, certain meeting endpoints are not actual physical meeting rooms, but instead participants that engage in the online collaborative meeting session via their computing device(s). In order for each remote meeting participant utilizing a computing device to be enabled with the same or similar experience of the physical meeting room participants, a virtual meeting room is generated by one or more meeting servers associated with the collaborative meeting session, where the virtual meeting room is displayed by the computing device of a remote participant and the virtual meeting room includes a virtual display of the common work spaces that display the same or identical content as in the physical meeting rooms. The remote participant is enabled with the ability, via their computing device, to navigate within the virtual meeting room in order to change a particular view, magnify or zoom into a particular view (e.g., to display a magnified view of a particular work space), etc. Each of the meeting endpoints allow participants to engage in co-creation and co-editing of content associated with the plurality of work spaces utilizing control features as described herein, such as virtual avatars that allow participants to manipulate content associated with work spaces.

An example collaborative meeting environment or platform that facilitates remote endpoints engaging in collaborative meeting sessions for the sharing, co-creation and co-editing of content in real-time is depicted in the example embodiment of FIG. 1. In particular, a system comprises one or more meeting servers 40 that connect with a plurality of meeting endpoints 4-1, 4-2, 4-3, . . . 4-N (where N can be any suitable number, such as two, three, tens, hundreds, thousands or greater) over one or more networks 2. The network(s) 2 facilitate communications and exchange of communications and content between the meeting endpoints 4-N via the one or more host meeting servers 40. Examples of types of networks that can be utilized within the system depicted in FIG. 1 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

The meeting server(s) 40 provide a number of hosting services over the network(s) 2 to meeting endpoints 4-N to facilitate a wide variety of exchanges of different types of content and communications as well as other information between participants at the meeting devices 4-N. For example, the meeting server(s) 40 can establish social networking environments for meeting endpoints that allow the meeting endpoints to engage in a variety of communications, such as email, instant messaging (IM), posting of blogs or other content and supporting of groups or communities of different participants or users within the platform.

In addition, the meeting server(s) 40 support the features of collaborative meeting sessions as described herein, which includes audio and/or video (A/V) conferencing, sharing of content via work spaces (such as white boards, desktop/screen sharing (e.g., sharing of content from one computing device at one meeting endpoint with other meeting endpoints), etc.) and sharing of any other types of content or communications during such meeting sessions.

A network platform is established between meeting server(s) 40 and meeting endpoints 4-N that includes software tools or software application modules and related services that link client devices allowing participants to communicate with each other in a variety of different ways (e.g., via email, instant messaging, audio and/or video conferencing, etc.) and share content (e.g., documents, whiteboard content, or any other types of forms of content or information for use at the common work spaces or for any other purpose) via the platform. The term "tool" is used herein to refer to one or more "application" software functions or sets of functions provided by one or more software applications on one or more computing devices associated with each meeting endpoint and/or hosted on any meeting server on behalf of a meeting endpoint.

Application modules refer to a set of one or more software applications that provide the software tools used by computing devices of the meeting endpoints and/or the meeting server(s). The network platform comprises software applications and associated hardware (e.g., processors, input/output devices, etc.) that perform the various operations and functions associated with communications and exchange of information or content between meeting endpoints and meeting servers during online collaborative meeting sessions or other forms of communication/exchanges of content, based upon techniques described herein, where the software applications are located on computing devices of meeting endpoints 4-N, one or more meeting servers 40, as well as any other computing devices within the network(s) 2.

The network platform that supports meetings between meeting endpoints 4-N utilizing one or more meeting servers 40 can be configured for use with any suitable commercial or other software products and related services including, without limitation, WebEx Connect (Cisco Systems, Inc.), Microsoft SharePoint (Microsoft Corporation) and Lotus-Live (IBM Corporation). As previously noted, such platforms, in addition to facilitating online collaborative meetings between meeting endpoints, can also provide other forms of communications as well as exchange of other types of information or content.

Online collaborative meetings that can be supported by the network platform include the exchange of A/V content (e.g., where video of one or more presenters or other participants is shared with some or all meeting endpoints), and the sharing of any types of content for online collaborative meetings via electronic work spaces, where the content can include, without limitation, white boarding content, screen content or desktop sharing by one or more computing devices of meeting endpoints, and any suitable telepresence features that enhance the audio and/or video components as well as the sharing, co-creation and co-editing of content during online collaborative meetings to provide the look and "feel" for participants at different meeting endpoints as if they were meeting in the same room. Examples of other types of communications and exchange of information or content within the network platform that can occur within or during an online collaborative meeting session or separate from such session include, without limitation, messaging, including sending and receiving of real-time messages (e.g., email, calendaring and scheduling, creating/modifying/updating of contact lists, instant messaging, short messaging service or SMS), creating/modifying/updating of groups or communities within the network platform (where communities comprise a group of users sharing one or more common goals or interests, where content within the communities typically relates to such goals or interests), and synchronization and organization of documents or files common to a particular community or group associated with the files (e.g., organization of posted or edited web logs or blogs, wikis, other forms of written ideas and/or notes, etc.).

The meeting server(s) 40 connect to one or more storage repositories 60-1, 60-2, . . . 60-M (where M is any suitable number) to facilitate storage of communications between meeting endpoints 4-N and storage of content that is shared, co-created, co-edited, etc. during each online collaborative meeting session. For example, an online collaborative meeting session can be recorded, including a recording of all audio and/or video content associated with participants or presenters during the session, as well as all content that was shared and also changed or edited during the session. The content that is associated with each storage space can also be stored as separate documents or content items or elements with the recorded session. For example, content elements (e.g., text documents, figures, spreadsheets, two-dimensional or three-dimensional graphics documents, etc.) used to provide content to the work spaces and which are generated utilizing software programs such as computer-aided design (CAD) software programs, word processing software programs, spreadsheet software programs, note posting software programs, graphics design software programs, etc. can be stored by one or more storage repositories 60-M along with the recorded session. Each content element can be stored as various versions during the co-creation/co-editing of the content elements, including the original content element (e.g., a content element originally provided for a work space) as well as various edited versions of the content element.

Each storage repository 60-M includes suitable memory storage capacity to store content associated with multiple online collaborative meeting sessions, including a recorded presentation of a session as well as content associated with each working space (where a history of the content for each working space and how it may have changed during the session is captured and stored at one or more storage repositories 60-M). Each storage repository 60-M can comprise any suitable memory storage device that may include one or more of read only memory (ROM), random access memory (RAM), magnetic disk storage media devices, optical storage media devices, flash memory devices, electrical, optical, or other physical/tangible memory storage devices, and any combinations thereof. Each storage repository 60-M can be configured as a separate unit from the meeting server(s) 40 (e.g., configured as offsite storage warehouses) or, alternatively, configured as integral in some manner with the meeting server(s) 40 (e.g., as part of a meeting server or on site with the meeting server).

Figure 2:
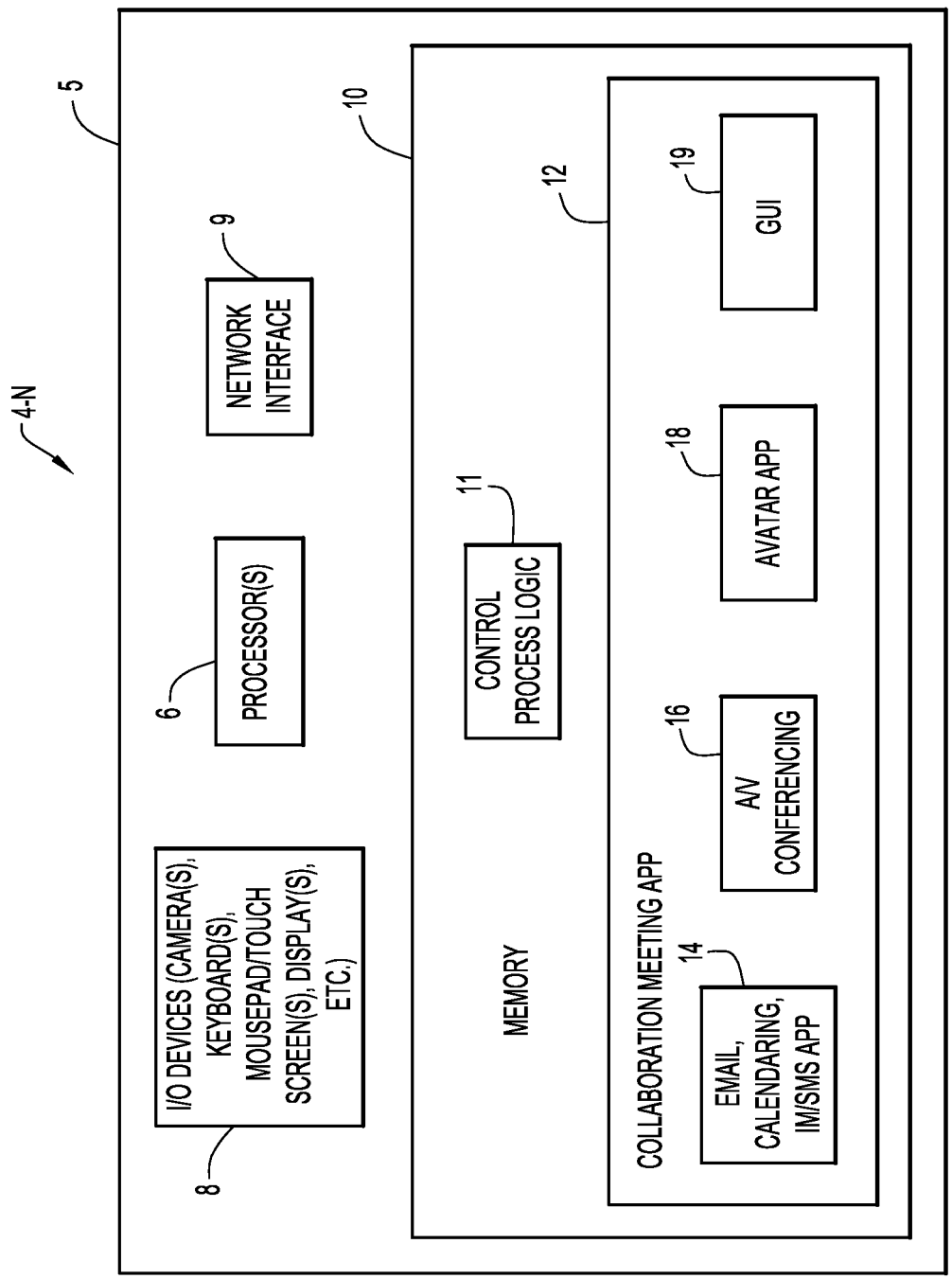
FIG. 2 is a schematic block diagram of an example embodiment of a meeting endpoint comprising a computing device for the system of FIG. 1.

An example embodiment of a meeting endpoint for a remote participant (i.e., a participant that is not attending a collaborative meeting session within a physical meeting room) is depicted in FIG. 2. In particular, the meeting endpoint 4-N comprises a computing device 5 that includes one or more processors 6, any suitable input/output (I/O) devices 8 that include, without limitation, one or more cameras, keyboards, mouse pads/touch screens, displays, microphones, audio speakers, etc. to facilitate input and output of content and exchange of communications or other information between the remote participant via the computing device and other meeting endpoints, a network interface 9 and a memory 10. The display(s) of I/O devices 8 for the computing device 5 can include an LCD or any other suitable type of display, including touch pad displays (e.g., for tablets, smart phones, or other portable types of computing devices) for display of content associated with an online collaborative meeting session and/or any other operation performed by the computing device 5.

The network interface 9 can be, for example, one or more of an Ethernet interface card or switch, a modem, a router or any other suitable hardware device that facilitates a wireless and/or hardwire connection over the network 2 with one or more computing devices (e.g., one or more computing devices of one or more meeting servers 40), where the network interface unit can be integrated within the computing device 5 or a peripheral that connects with the computing device 5.

The processor 6 can comprise at least one microprocessor that executes control process logic instructions 11 stored within memory 10 including operational instructions and software applications stored within such memory.

The memory 10 may comprise read only memory (ROM), random access memory (RAM), magnetic disk storage media devices, optical storage media devices, flash memory devices, electrical, optical, or other physical/tangible memory storage devices, and any combinations thereof.

The memory 10 of the computing device 5 includes a collaboration meeting software application module 12 comprising one or more software applications that provide software tools to facilitate communications and exchange of content with other meeting endpoints via one or more meeting servers 40, including engaging in online collaborative meeting sessions in accordance with the techniques described herein. For example, the collaboration meeting software application module 12 includes one or more messaging software applications 14 to facilitate email, calendaring and meeting scheduling, instant messaging (IM) and/or short message service (SMS) messaging, as well as any other forms of communications, one or more software applications 16 (including suitable coder/decoder or codec applications for the coding and decoding of video and/or other data streams associated with a meeting session) to facilitate engaging in A/V conferencing in which audio and/or video content is provided by the computing device 5 (e.g., via one or more cameras and/or microphones) or received from one or more other meeting endpoints, one or more software applications 19 that enable interactive control of a graphical user interface (GUI) by the remote participant (e.g., via an input device, such as a keyboard, mouse pad or touch screen) that is displayed by the computing device 5 and allows the participant to engage sharing and manipulation/editing of content associated with work spaces in a virtual meeting room hosted by the meeting server(s) 40. For example, the GUI application(s) 19 can allow the meeting participant to share screen content from the computing device 5, e.g., within one or more of the common work spaces for a meeting session or engage in any other activities associated with the meeting session. The module 12 further includes one or more applications 18 that enable interactive control by the remote participant (e.g., using input devices of the computing device 5, such as a keyboard, a touch screen, a mouse pad, etc.) of a virtual avatar that is used to manipulate content with one or more work spaces and also to navigate within the virtual meeting room hosted by the meeting server(s) 40 utilizing the techniques as described herein. While the applications 14, 16, 18 and 19 are depicted in FIG. 2 as being separate, it is noted that any one or more of these applications can also be combined with any one or more of the others while still performing the operations and features for these applications as described herein.

Figure 3:
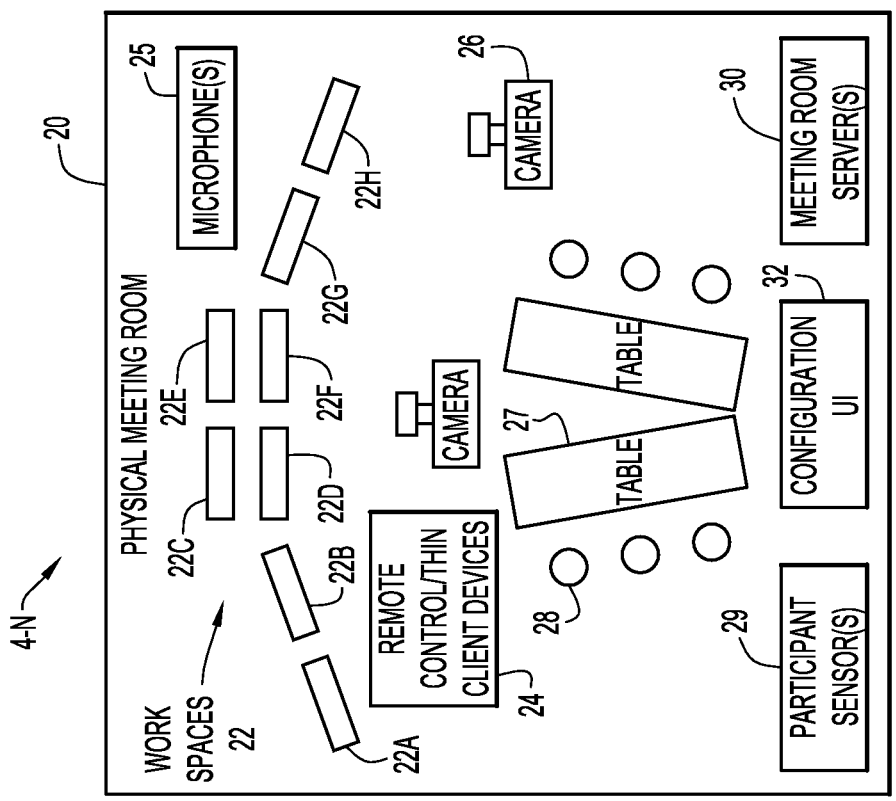
FIG. 3 is an example embodiment schematically depicting a top view in plan of a meeting endpoint comprising a physical meeting room for the system of FIG. 1.

An example embodiment of a meeting endpoint 4-N that comprises a physical meeting room 20 is depicted in FIG. 3. The physical meeting room 20 includes one or more tables 27 and people generally depicted as 28 seated at the tables 27. One or more microphones 25 and cameras 26 are provided at one or more suitable locations within the meeting room 20 to capture audio and video content of participants within the room 20 (e.g., for display of video content to other meeting endpoints). Lighting and any other suitable telepresence devices can also be provided within the meeting room 20 to enhance the video and audio content provided from the meeting room 20 to other meeting endpoints.

The physical meeting room 20 also includes a plurality of electronic work spaces 22, including work spaces 22A-22H, that are physically located at suitable locations within the room 20 (e.g., positioned at a front room location). The work spaces 22 depicted within room 20 are in the form of electronic devices including two-dimensional surfaces for displaying content, such as electronic white boards, touch screens, video displays, etc. Corresponding work spaces that are presented within a virtual room are mapped or assigned to include the same content as that which is presented within the work spaces 22 of physical rooms 20. In other words, work space 22A in physical meeting room 20 includes content that is the same as content provided at a commonly designated work space for all other meeting endpoints, work space 22B in physical meeting room 20 includes the same content that is provided at a commonly designated work space for all other meeting endpoints, etc. As previously noted herein, the term "work space" or "electronic work space", as described herein, refers to any one or more electronic devices in a physical meeting room or any defined area within the display of a virtual meeting room that facilitates display and editing of content by different meeting endpoints during an online collaborative meeting session.

The work spaces can include content in the form of documents or other content items or elements, such as a shared document (e.g., a word processing document, spreadsheet document, slide presentation document, computer aided design document, etc.), video content captured by one or more cameras located at any one or more meeting endpoints, or any other form of content that is to be used for co-creation/co-editing/collaboration within a meeting session. In certain embodiments, work spaces can include views of content that facilitate magnification of a background so as to provide a close-up view of certain content or a shifting of a view to include content in a foreground, as well as changes in views of the content (e.g., changing from a perspective view to a front view). Further, it is noted that work spaces can represent two-dimensional views of content and also three-dimensional views of content. For example, content can be displayed for sharing and editing by any one or more meeting endpoints in a two-dimensional environment (e.g., graphs, charts, word processing documents, etc.) within a work area. Content can also be displayed for sharing and editing in a three-dimensional environment. For example, computer aided design (CAD) software programs can be utilized to present three dimensional views of objects or other forms of content that can be manipulated and/or edited by participants at one or more meeting endpoints. These views could be delivered in a two dimensional work space (e.g., in a display) and/or within a three dimensional work space in a physical room meeting endpoint by using, e.g., a holographic display.

As described herein, any suitable input devices at meeting endpoints can be used to view (e.g., change a view), manipulate and/or edit content within a work space. In addition, in scenarios in which three-dimensional views of content are provided within a work space, input devices such as haptic devices (e.g., electronic devices connected to a participant's fingers, hands or other body parts) can be utilized to effect changes in the view of content or to the content itself within the work space. For example, in an embodiment in which a CAD software program is executed to provide content in a work space, a participant at a meeting endpoint may utilize an input device such as a haptic glove to provide inputs to the system which result in a manipulation or change of some portion or portions of content within the CAD software program.

The electronic work spaces 22 are connected, via hard wire and/or wireless links, to one or more meeting room servers 30 that host or support interactive operation of the work spaces 22 with other electronic devices within the meeting room 20. The meeting room server(s) 30 can be configured with similar features as computing device 5, including a memory with a collaboration meeting software application module that is similar to that described for computing device 5. Each meeting room server 30 is further configured to provide a communication link between work spaces 22 and other electronic or computing devices within the meeting room 20 with the meeting server(s) 40 for facilitating exchange of content between participants in the meeting room 20 and other participants at other meeting endpoints during an online collaborative meeting session. In particular, the meeting room server(s) 30, via communicating with the meeting server(s) 40, facilitate a synchronous display of the same content at the work spaces 22 which is commonly displayed at the corresponding work surfaces located at other meeting endpoints as the content at one or more work spaces 22 changes during the course of an online collaborative meeting session (e.g., due to editing of content at one or more work spaces due to actions of participants at different meeting endpoints).

Any suitable number of remote control/thin client devices 24 can be provided in the physical meeting room 20, including computing devices (e.g., laptops, tablets, etc.) that connect (e.g., via hardwire or wireless link) with the meeting room server(s) 30 to facilitate interactive control of content at one or more of the electronic work spaces 22 (e.g., manipulation of content within a work space 22 via an input device of the remote control/thin client device 24, such as a keyboard, mouse pad, touch screen, etc.). The devices 24 can also have a similar configuration as computing device 5, including a memory with a collaboration meeting software application module that is similar to that described for computing device 5 and also suitable software that enables the devices 24 to communicate with the meeting room server(s) 30.

One or more participant sensors 29 can also be provided within the physical meeting room 20, where the participant sensors 29 are configured to detect the presence of specific meeting participants that are in the meeting room 20 at any given time. For example, the participant sensors 29 can comprise detectors that detect radio wave frequencies or any other suitable frequencies emitted by electronic badges, cellular phones or any other suitable transmitter devices carried by participants so as to provide an indication that certain specific participants are located within the room 20

(e.g., a scheduled presenter). The participant sensors 29 can also be configured as voice and/or face recognition software modules (e.g., implemented within the meeting room server(s) 30) including one or more software applications that are configured to identify (via one or more cameras 26 or microphones located within the room 20) specific participants that are located within the room. The one or more participant sensors 29 communicate (via hard wire or wireless link) with the meeting room server(s) 30 to provide information regarding the presence of specific participants within the meeting room 20 based upon the detection of such participants as being within the room. The participant presence information is provided by the meeting room server(s) 30 to the meeting server(s) 40 that host the online collaborative meeting session, where such information can be used to determine certain meeting criteria such as when a meeting session will be initiated, the types of content and/or work spaces to be implemented for the meeting endpoints (e.g., based upon the type of meeting content that may be associated with a specific participant), etc.

The meeting room 20 is further provided with at least one electronic user interface (UI) configuration device 32 that connects with the meeting room server(s) 30 and the meeting server(s) 40 (e.g., via a hard wire or wireless connection as well as connection over network(s) 2) to facilitate an interface (e.g., a "one touch" interface) for participants within the room to select a particular collaboration mode for the work spaces 22. For example, the UI configuration device 32 can provide the participants with the ability to select options within an online collaborative meeting session (e.g., a co-creation option in which participants within the meeting room or at other meeting endpoints are provided access to manipulate content associated with one or more common work spaces), activating or de-activating work spaces 22, moving and/or rotating work spaces 22 to facilitate best views for content or based upon a change in view selected by participants in the meeting room 20 or at other meeting endpoints, adjusting lighting within the meeting room 20, etc. It is noted that the work spaces 22 comprising electronic devices that display two-dimensional or three-dimensional content can be mounted on any suitable motion activation system, such as a electronic motorized track system that provides automated/user controlled vertical and lateral/horizontal movements as well as rotational movements (e.g., from 0° to 360°) of one or more work spaces 22 (e.g., utilizing the UI configuration device 32 or initiated remotely based upon command instructions provided by another meeting endpoint).

Figure 4:
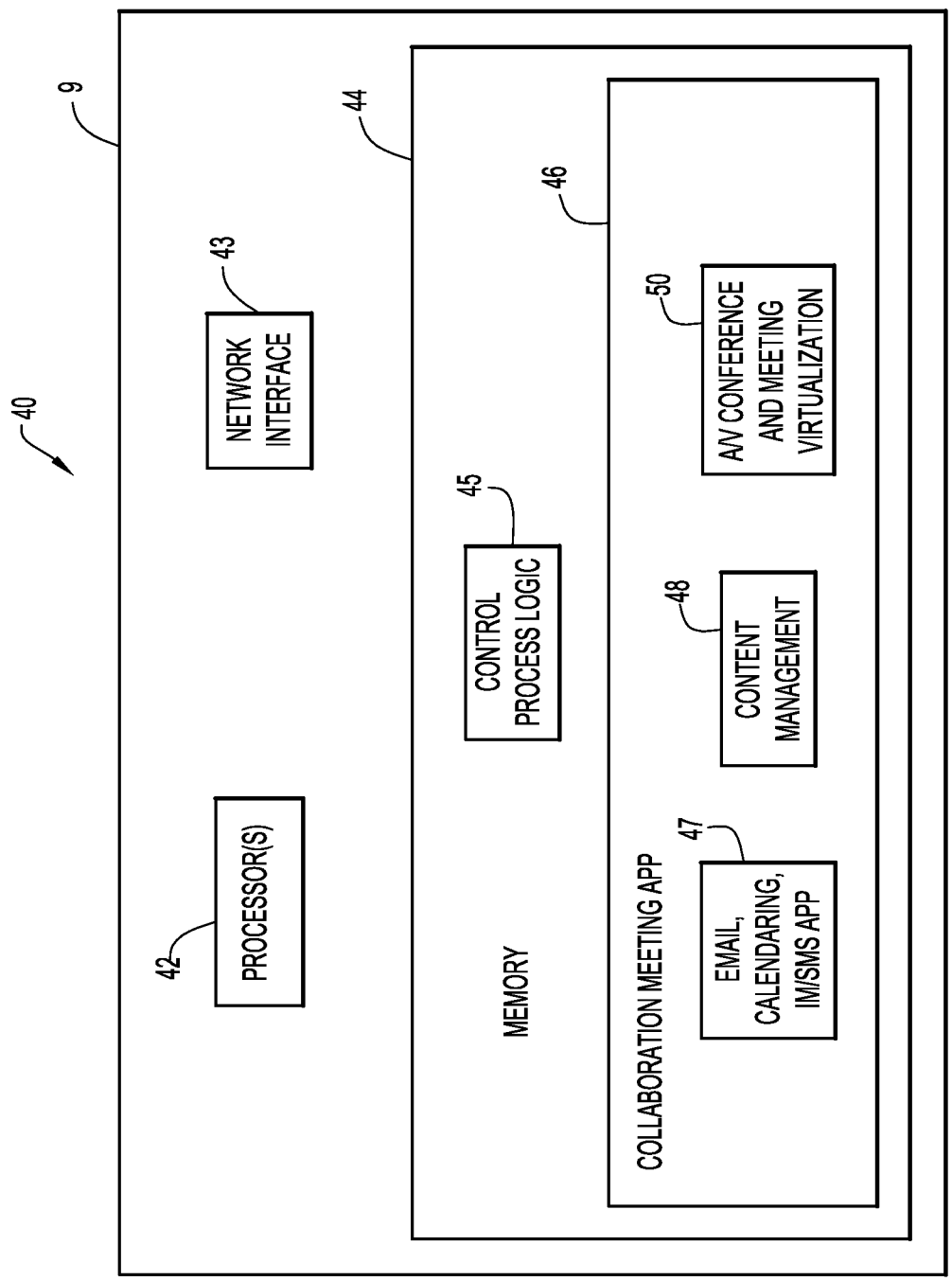
FIG. 4 is a schematic block diagram of an example embodiment of a meeting server for the system of FIG. 1.

An example embodiment of a meeting server 40 is depicted in FIG. 4. In particular, the meeting server 40 includes one or more processors 42, a network interface 43 (e.g., similar to the types described for computing device 5), and a memory 44 (e.g., similar to the types described for computing device 5). The meeting server 40 can also optionally include any suitable I/O devices such as any of the types described in relation to computing device 5. The processor(s) 42 can comprise at least one microprocessor that executes control process logic instructions 45 stored within memory 44 including operational instructions and software applications stored within such memory. Some of the software applications stored within memory 44 include a collaboration meeting application module 46 that includes one or more software applications 47 that facilitate email communications, IM/SMS communications between computing devices at meeting endpoints 4-N as well as calendaring/meeting scheduling features, one or more software applications 48 that process, store and/or manage the exchange of content that is communicated the meeting platform between meeting endpoints 4-N including, without limitation, email communications, content associated with meeting groups or communities, content associated with blogs or other postings within the meeting platform, and recordings of online collaborative meetings and content items associated with such meetings. As previously noted, the content that is exchanged in the various types of communications and meetings is stored within storage repositories 60-M, and the one or more content management software applications 48 facilitate communication between the meeting server(s) 40 and the storage repositories 60-M to enable storage and retrieval of such stored content.

Figure 5:
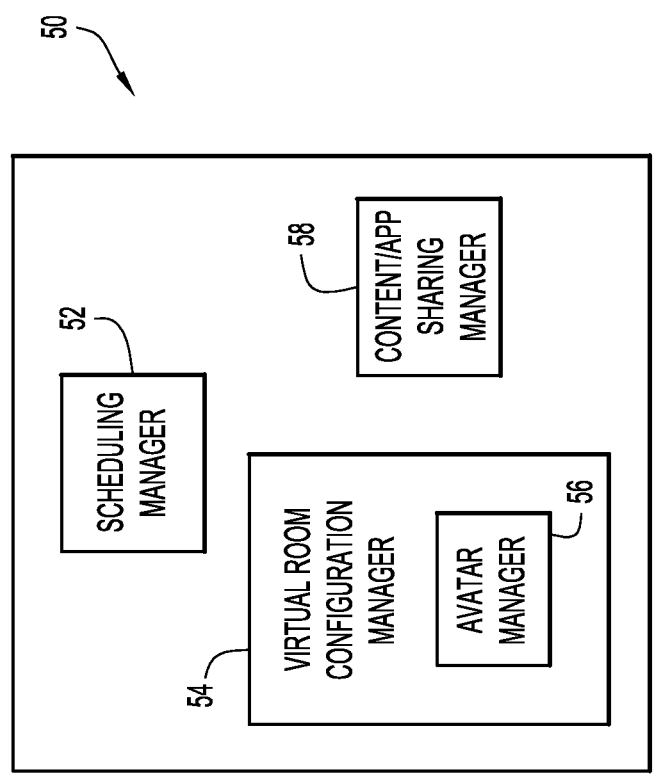
FIG. 5 is a schematic block diagram of an example embodiment of an A/V conference and meeting virtualization software application module associated with a meeting server of the system of FIG. 1.

The memory 46 of the meeting server 40 further includes one or more A/V conference and meeting virtualization software applications 50 that host online collaborative meeting sessions between meeting endpoints and enable features associated with such meeting sessions. An example embodiment of the A/V conference and meeting virtualization software applications 50 is depicted in FIG. 5. In particular, the A/V conference and meeting virtualization software applications 50 include a scheduling manager 52 comprising one or more software applications that facilitate scheduling of an online collaborative meeting session based upon techniques as described herein, a virtual room configuration manager 54 comprising one or more software applications that configure common work spaces for each meeting endpoint 4-N and also a virtual room for remote participants (e.g., participants that are not in a meeting room 20 but instead engaged in the meeting session via a computing device 5) based upon techniques as described herein, and a content/application sharing manager 58 comprising one or more software applications that facilitate sharing of content and also applications required for manipulation and display of such content with meeting endpoints 4-N based upon techniques as described herein. While the scheduling manager 52, virtual room configuration manager 54 and content/application sharing manager 58 are depicted as one or more separate software applications in FIG. 5, it is noted that any one or more of these applications can be combined with any one or more other applications while still performing the operations and features as described herein.

The scheduling manager 52 allows participants at different meeting endpoints to provide information (via computing devices associated with such meeting endpoints) regarding what content will be provided for a meeting session, what software applications will be needed to generate, edit/co-create and display content as well as the types and number of work spaces required and also certain participants that may be required to be within a meeting room 20 for a meeting session to be initiated. For example, in a scenario in which content such as a three-dimensional graphical display document utilizing CAD software, content associated with a word processing document, content associated with a slide presentation document, and content associated with a spreadsheet document, is to be presented at the work spaces for editing or manipulation by participants at different meeting endpoints, the scheduling manager 52 can coordinate with the content/application sharing manager 58 to ensure that all meeting endpoints 4-N can display and manipulate these types of content items. To the extent certain software applications need to be hosted and executed by a meeting server 40 for sharing with one or more meeting endpoints (e.g., in scenarios in which such software applications are not local to one or more meeting endpoints), the scheduling manager 52 is configured to ensure that such software applications are available for use by the meeting server(s) 40 that will host the meeting session, where such software applications will be executed by the meeting server(s) 40 and available for virtual use (i.e., for use within the online collaborative meeting session) by meeting endpoints that are in need of the applications.

Thus, meeting endpoints 4-N are not required to have all software applications necessary for displaying and manipulating content items to be displayed for co-creation/co-editing within an online collaborative meeting session. To the extent a meeting endpoint does not have, e.g., a CAD software application for the content item associated with the CAD software (or any other software application for generation/editing of other types of content), the scheduling manager 52 facilitates access to a suitable CAD software application (or other software application), via the content/application sharing manager 58, that is hosted by the meeting server(s) 40. Thus, the meeting endpoint can manipulate such content at the corresponding work space and within the online collaborative meeting session by virtual use of the CAD software application (or other software application), where the application is executed by the host meeting server(s) 40 and available for virtual use by the meeting endpoint within the online collaborative meeting session.

The scheduling manager 52 is further configured to review calendars/schedules of meeting participants at meeting endpoints 4-N (utilizing, e.g., the application(s) 47) to determine one or more best times to initiate an online collaborative meeting session based upon available/open times on calendars of known participants. A list of essential participants can be provided, e.g., from meeting endpoints 4-N to meeting server(s) 40 in preparation for a desired meeting. Information regarding one or more potential meeting times, based upon the best determined availabilities of known and/or essential participants, can be provided to meeting endpoints with suggestions of meeting times that would not present a conflict.

The scheduling manager 52 can also utilize information obtained from participant sensors 29 provided in physical meeting rooms 20 to determine when certain essential participants are within meeting rooms 20. Based upon this information, the scheduling manager 52 can instruct the virtual room configuration manager 54 to finalize the generation of the virtual room and the mapping of content to be provided for the meeting to a selected number and types of common work spaces for all meeting endpoints 4-N. The scheduling manager 52 can further initiate the meeting session when essential participants are identified as being within meeting rooms 20 or logged into the meeting session (if an essential participant is not within a meeting room 20 but is instead engaging in the meeting via a computing device 5) of meeting endpoints 4-N.

The virtual room configuration manager 54 receives information from the scheduling manager 52 regarding types of content to be provided within a meeting session and number and types of work spaces associated with each meeting endpoint 4-N and accordingly maps content to work spaces that will be common to all meeting endpoints. For example, consider a scenario in which three meeting endpoints are to engage in an online collaborative meeting session, where a first meeting endpoint comprises a meeting room with five electronic devices to display content (e.g., two electronic white boards, and three display/touch screen panels) a second meeting endpoint comprises a meeting room with three electronic devices to display content (e.g., one electronic white board and two display/touch screen panels), and a third meeting endpoint comprises a remote participant engaging in the meeting utilizing a laptop (e.g., configured similar to the computing device 5). Depending upon the different types of content to be presented in the meeting session and the number of available work spaces for the physical meeting rooms, the virtual room configuration manager 54 may determine that three common work spaces need to be mapped to three electronic devices for the first and second meeting endpoints, and the virtual room to be generated by the virtual room configuration manager 54 will also include three work spaces.

In another example utilizing the same three meeting endpoints, the virtual room configuration manager 54 may determine that five common work spaces need to be mapped to electronic devices of the first and second meeting endpoints. In this scenario, the second meeting endpoint is limited by the physical constraint of having only three electronic devices to which work spaces can be mapped. However, the configuration manager 54 can configure one or more electronic devices of the second meeting endpoint to simultaneously display two or more work spaces (e.g., by splitting a display/touch screen or electronic white board into two work spaces for displaying and facilitating editing of two different content items).

Alternatively, the configuration manager 54 can configure the work spaces for the second meeting endpoint such that one or more electronic devices alternately display two or more work spaces, where each electronic device that is configured to alternately display a plurality of work spaces can be manually toggled or switched (e.g., using the configuration UI device 32) between display of different work spaces by participants within the meeting room and/or automatically switched between display of different work spaces by the meeting server(s) 40 based upon which content is the current topic of discussion within the meeting session (e.g., as determined by manipulation of content by an avatar of a meeting endpoint within the meeting session). Thus, for example, the second meeting endpoint may be configured such that one or more of its electronic devices switches from displaying and rendering manipulation/editing of content for one work space to any one or more other work spaces during a meeting session.

It is noted that the virtual room displayed and rendered interactive at the third meeting endpoint may not be limited with a number of work spaces in the way in which some physical rooms might be (due to the physical constraints of having a limited number of electronic devices that support such work spaces within certain physical meeting rooms).

Figure 8:
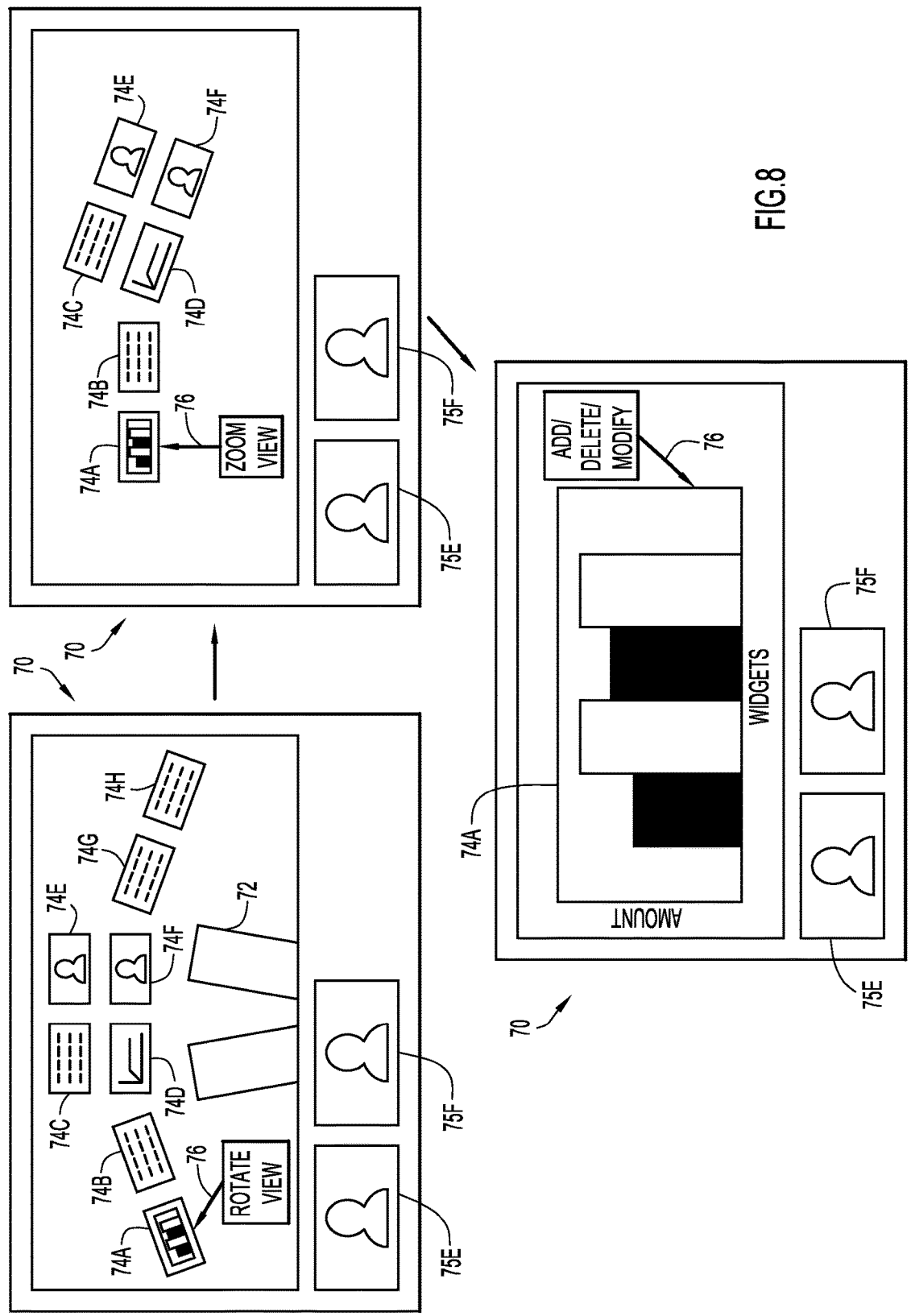
FIG. 8 is an example embodiment schematically depicting various views of a virtual meeting room associated with a collaborative meeting session that are controlled by a remote participant for display on a computing device.

The virtual room configuration manager 54 generates a virtual room including work spaces for participants at meeting endpoints 4-N that cannot attend an online collaborative meeting session in a physical room. The virtual room can be displayed by a computing device, such as computing device 5 (e.g., within the GUI 19 of the computing device 5), where the participant can interact within the virtual room using a virtual avatar as described herein. Interaction includes moving within the virtual room, using the virtual avatar, so that the participant can change views and move toward certain work spaces to enable the participant to view or modify/edit content with the work spaces. An example embodiment of a virtual room 70 that can be generated by the virtual room configuration manager 54 for participants at remote meeting endpoints is depicted in FIG. 8. The manager 54 utilizes known information (e.g., information provided to the meeting server(s) 40 in relation to physical meeting rooms 20 for meeting endpoints scheduled for a meeting session) regarding locations of tables, chairs, participants and any other furniture or equipment as well as locations and configurations of electronic devices to be assigned as work spaces within the meeting rooms 20 in order to generate a virtual room having a configuration that is similar or substantially identical to one or more of the meeting rooms 20. The physical meeting rooms 20 can be set up as substantially similar to each other, with table, chair, other equipment configurations provided in a similar arrangement (or as close as possible) in order to provide the "look" and "feel" to participants at different meeting endpoints as though they were all within the same meeting room. The virtual room generated by the manager 54 includes the same or similar configuration in order to provide the participants at remote meeting endpoints 4-N with the same "look" and "feel" of being in the same room with all collaborating participants engaged in the meeting session.

The virtual room configuration manager 54 includes an avatar manager 56 comprising one or more software applications that map or assign virtual avatars to work spaces for use by meeting endpoints and for display at the work spaces by at least the meeting endpoints to which such virtual avatars are assigned. The virtual avatars comprise any suitable icon and/or graphical or textual display within one or more work spaces that can be visible to some or all meeting endpoints during the meeting session, where the avatars render interactive viewing, enhancement and manipulation of content by a meeting endpoint for a work space to which the avatar is currently assigned. For example, a virtual avatar that is visible to all meeting endpoints at one or more work spaces can comprise a graphical representation of a person (e.g., a stick type figure or some other representation of a person, optionally with an arrow, pointer or other suitable icon for pointing to specific portions of content within a work space) that is currently presenting within the meeting session. In addition, invisible virtual avatars can also be provided for display at one or more work spaces for meeting endpoints to which such virtual avatars are assigned. For example, a participant at a meeting endpoint that is not a presenter may wish to change a view or manipulate or edit content at a work space, and a virtual avatar may be used that is visible at the work space of that meeting endpoint but invisible (or portions of the avatar are invisible) at the common work space for other meeting endpoints.

The avatars that are enabled for use by the avatar manager 56 for meeting endpoints can be controlled utilizing any suitable input device associated with one or more computing or electronic devices at each meeting endpoint 4-N. For example, a participant at a meeting endpoint can utilize a computing device (e.g., computing device 5 for a remote participant, a remote control/thin client device 24, the configuration UI device 32 within a meeting room 20, etc.) to effect changes or manipulate content or move an icon, cursor, pointer, or any other graphical depiction for the work space as displayed within a virtual room or displayed by electronic devices defining work spaces 22 within physical meeting rooms 20. For electronic devices defining work spaces 22 within physical meeting rooms 20 that include input features (e.g., a touch screen display for an electronic whiteboard or any other input devices associated with the electronic devices), the input features of such electronic devices can also be utilized by participants to control operations of avatars associated with work spaces and assigned to the meeting endpoints.

In an example scenario, a visible avatar that is displayed at the same work space for all meeting endpoints may be utilized by a participant at one of the meeting endpoints when that participant is currently a presenter or speaker within an online collaborative meeting session. The participant controls the avatar at a work space, utilizing any one or more suitable input devices as previously described herein, to present and manipulate content within the work space that is viewed in real-time by other participants at the same meeting endpoint and also at other meeting endpoints at the commonly designated work space. An example embodiment of FIG. 9 depicts the same or common work space 74-1, 74-2 and 74-3 for different meeting endpoints, where one meeting endpoint (in which the meeting space 74-1 is displayed within a virtual room generated by the virtual room configuration manager 54) shows a virtual avatar 76-1 that is visible (or at least a portion of which is visible) for the common work spaces 74-2, 74-3 of the other meeting endpoints. The other meeting endpoints including work spaces 74-2 and 74-3 are physical meeting rooms 20 (e.g., at locations identified as London and Tokyo, respectively). The virtual avatar 76-1 represents, e.g., a participant at a meeting endpoint that is currently a presenter within the meeting session and is discussing content as shown in the work spaces 74-1, 74-2, 74-3 (e.g., a bar chart with information, where the virtual avatar 76-1 includes a pointer that is controlled by the participant/presenter to point to certain portions of content based upon what the participant/presenter is currently discussing within the meeting session). The participant/presenter can also modify or edit content within the work space 74-1 (e.g., changing information in the bar graph, or manipulating the content within the content item displayed by the work space to view different content, such as content on a different page or slide of the content item), utilizing avatar 76-1, where the other common work spaces 74-2 and 74-3 are updated in real-time with such modified or edited content.

Utilizing the same scenario as depicted in FIG. 9, invisible avatars 76-2 and 76-3 are also provided at work spaces 74-2 and 74-3 associated with different meeting endpoints (a London meeting endpoint and a Tokyo meeting endpoint). The invisible avatars 76-2 and 76-3 are depicted at work spaces 74-2 and 74-3 as pointers and can optionally include text that provides a location indication (e.g., London or Tokyo) for the avatar. Avatar 76-2 can be configured for display only at work space 74-2 of the corresponding meeting endpoint but being invisible (or at least partially invisible) at other work spaces 74-1 and 74-3. Avatar 76-3 can be configured in a similar manner (displayed at work space 74-3 but invisible or at least partially invisible at work spaces 74-1 and 74-2). The avatars 76-2 and 76-3 allow participants at the corresponding meeting endpoints to also edit or manipulate content within the work space that is translated in real-time to the other common work spaces. As shown in FIG. 9, at least a portion of the avatars 76-2 and 76-3 are shown in the work space 74-1 of the other meeting endpoint. In a scenario in which a complete avatar 76-2, 76-3 includes a stick figure or other graphical representation of a participant, that portion of the avatar can be invisible for the work space 74-1 (e.g., stick figures for avatars 76-2 and 76-3 are shown as dashed lines, indicating that this portion of each avatar is invisible in work space 74-1, while the pointers associated with these avatars are visible in work space 74-1). It is noted that each of work spaces 74-2 and 74-3 include close-up views of the chart, such that only the pointer portions of the avatars 76-2 and 76-3 are displayed. The avatars can be selectively controlled by participants at meeting endpoints such that any change in the view of content or to the content itself within a work space is translated to all other common work spaces at other meeting endpoints or, alternatively, the change in view of the content or to the content itself only occurs at the work space of the meeting endpoint to which an avatar making the change is assigned. For example, each of the avatars 76-1, 76-2 and 76-3 can change the magnification of the view of content within the corresponding work space 74-1, 74-2 or 74-3 (e.g., providing a close-up to a portion of the bar chart depicted in the work spaces, such as is shown in FIG. 9 for work spaces 74-2 and 74-3). In the case of an avatar representing a presenter, such change in magnification can be translated to all other common work spaces (since the presenter may desire for all participants to visualize a change in view of content based upon the discussion of the presenter). However, changes in magnification of a view of content by an avatar corresponding to a participant that is not a presenter may be limited to just the work space associated with the meeting endpoint to which that avatar is assigned.

Another feature of the avatars that is facilitated via the avatar manager 56 is a barrier that is provided in proximity to a work space that prevents a visible avatar (e.g., an avatar associated with a remote participant on a single device not in a room, that is visible to all common work spaces at different meeting endpoints) from being displayed in a region that is within a predefined proximity from content and/or from one or more invisible avatars within the common work spaces. An example of a barrier 77 is depicted as the dashed box within work space 74-1, where it is noted that the barrier 77 is invisible within the work space but prevents movement of the avatar 76-1 within the defined barrier 77. This prevents, e.g., portions of the avatar 76-1 from appearing in either work space 74-2 or 74-3 in which the view is a close-up of the bar chart (e.g., the avatar 76-1 is prevented from covering any portion of the bar chart in the close-up view shown in the work spaces 74-2 and 74-3).

A virtual avatar can be used by a participant within a virtual meeting room to navigate within the virtual meeting room, e.g., in a manner similar to how a participant can move through a physical meeting room. An example embodiment that illustrates navigation within a virtual meeting room 70 by a participant at a remote meeting endpoint for an online collaborative meeting session and using an avatar of the participant is depicted in FIG. 8. In particular, the virtual meeting room is displayed by the participant's computing device 5 (e.g., within a GUI 19 of the computing device) and includes a view showing virtual tables 72 that are arranged in a similar configuration as at least one of the physical meeting rooms 20 for meeting endpoints also engaged in the meeting session. Other furniture and/or equipment associated with the physical meeting rooms 20 can also be displayed within the virtual meeting room 70. A plurality of meeting spaces 74A, 74B, 74C, 74D, 74E, 74F, 74G and 74H are also provided in the virtual meeting room 70, where the meeting spaces 74A-74H are arranged in the same or similar locations and configurations as at least one of the physical meeting rooms 20 for a meeting endpoint also engaged in the meeting session. Thus, the configuration and location of items within the virtual meeting room 70 correspond in a similar manner with the physical items in at least one of the meeting rooms 20. As previously described herein, work spaces are mapped by the virtual room configuration manager 54 to electronic devices in physical meeting rooms (e.g., electronic white boards, displays/touch screens, etc.) and also to the virtual work spaces (e.g., work spaces 74A-74H) in the virtual room 70. The display of the computing device 5 for the remote meeting endpoint can also include some work spaces that display video content of participants such as presenters (e.g., work spaces 75E and 75F as shown in FIG. 9) as enlarged views beneath the display of the virtual room 70. One or more participants operating the computing device 5 can, via their virtual avatar (e.g., using the avatar application(s) 18) and/or control features provided by the GUI 19, select one or more work spaces that can be shown as enlarged views within the display in addition to the virtual room 70. Using the virtual avatar, shown as icon/arrow 76 in FIG. 9, the participant can choose to rotate the view within the virtual room 70 (e.g., by selecting a rotate view option with the avatar 76) which simulates movement within the room. The participant, via the virtual avatar 76, can manipulate the view within the virtual room 70 in a number of other additional ways, such as magnifying or zooming into the view (e.g., by selecting a zoom view option with the avatar 76) so as to focus on one particular work space (e.g., work space 74A). The avatar 76 can further edit content within the work space (e.g., by selecting an add/edit/modify option with the avatar 76), where any modifications to content can be translated in real-time to the other common work spaces associated with other meeting endpoints. For example, a participant, using the avatar 76, can modify content within the bar graph displayed in work space 74A (e.g., changing the X-axis or Y-axis text information, or modifying any of the other content within the bar graph), where such modification results in a real-time change to the content at the other common or corresponding work spaces at other meeting endpoints. In addition or as an alternative to using the avatar 76, the GUI 19 can be configured to facilitate the same or similar interactive features (e.g., by selecting pull-down menus, selecting icons, action buttons, etc. within the GUI 19) that allow a user to navigate within the virtual room 70 and also manipulate views and modify content within the work spaces within the virtual room 70.

Figure 6:
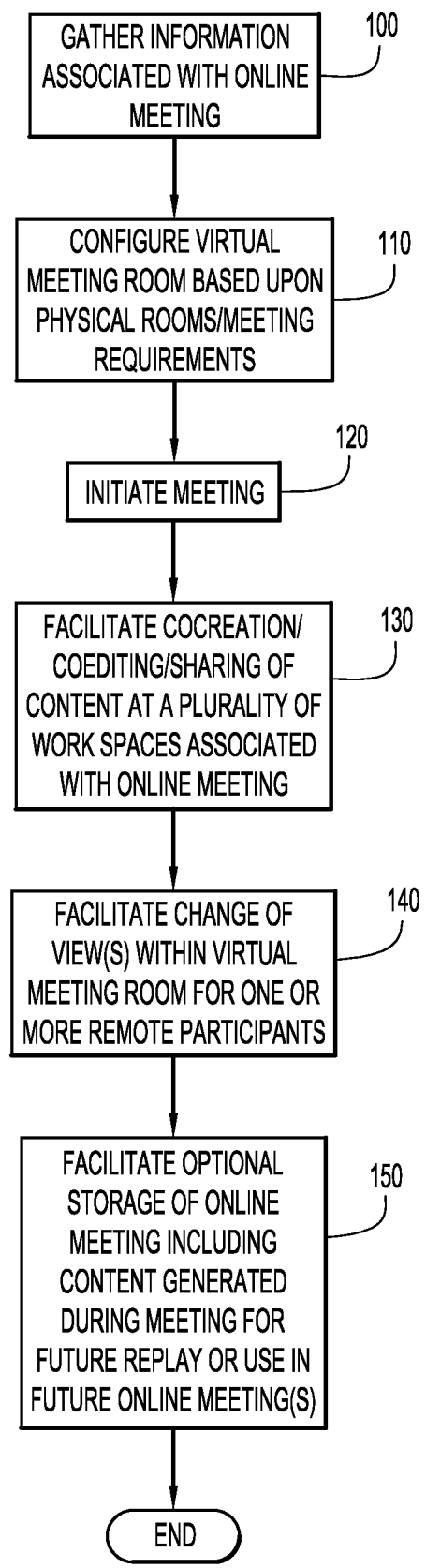
FIG. 6 is a flow chart depicting an example process for establishing a collaborative meeting including sharing, co-creation and co-editing of content via a plurality of workspaces and utilizing the system of FIG. 1 in accordance with example techniques described herein.
Figure 7:
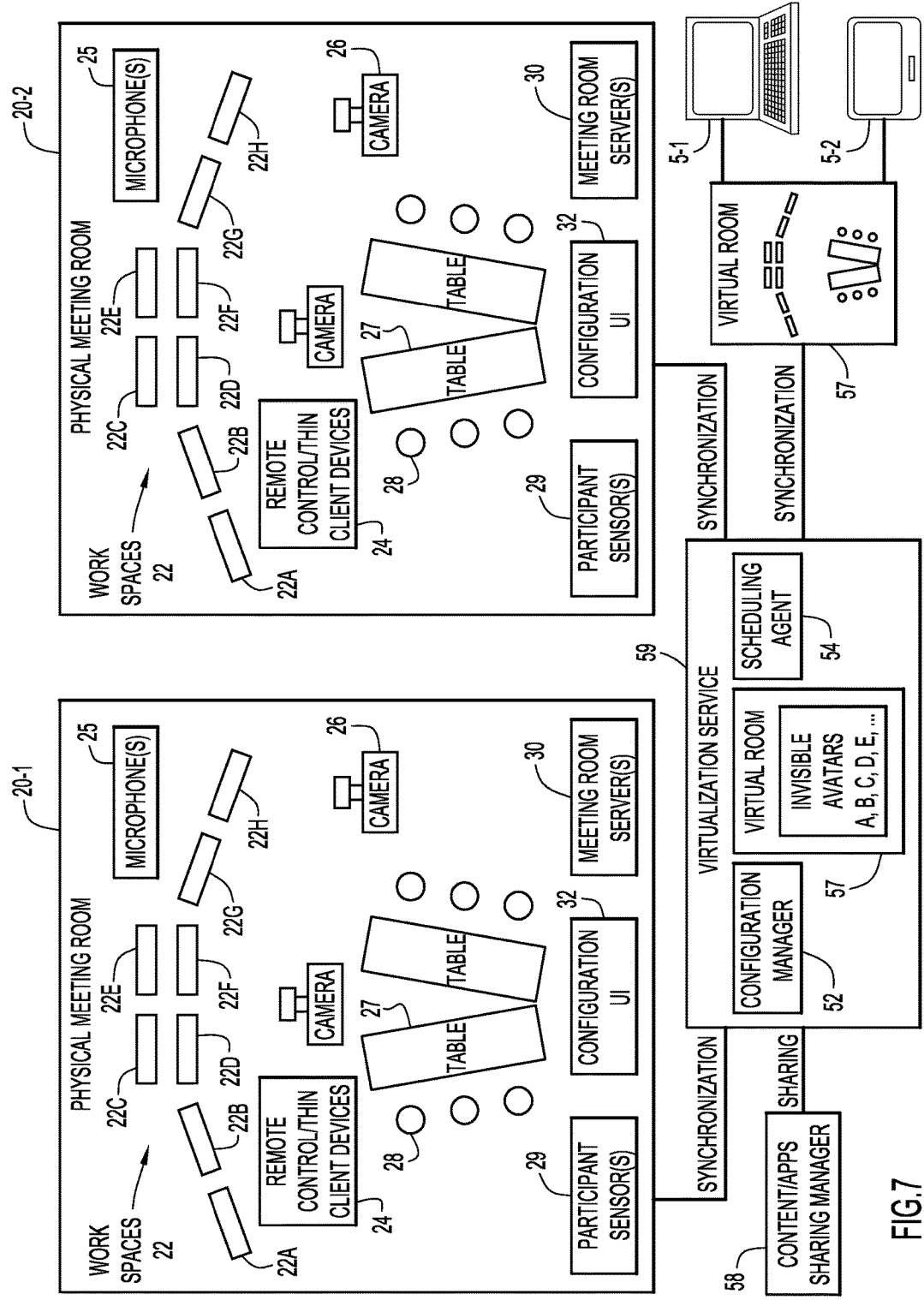
FIG. 7 is an example embodiment schematically depicting physical meeting rooms and virtual meeting rooms for remote participants over the collaboration meeting platform during a collaborative meeting session supported by the system of FIG. 1.

An example embodiment of scheduling and implementing an online collaborative meeting session utilizing the system as depicted in FIGS. 1-5 is now described utilizing techniques as set forth in FIG. 6 and further with reference to the embodiments depicted in FIGS. 7-9. Initially, at 100, information is gathered by a meeting server 40 (utilizing the scheduling manager 52) relating to meeting endpoints, participants at such meeting endpoints, content to be provided to the meeting, etc.

A meeting server 40 is provided with information from participants at meeting endpoints of possible participants for the meeting, and the meeting server 40 utilizes scheduling manager 52 and the one or more email, calendaring, IM/SMS applications 47 to determine the availability of participants based upon scanning information from the participant calendars. Meeting times can be recommended by the meeting server 40, utilizing the scheduling manager 52, to meeting endpoints. In addition, the scheduling manager 52 can schedule one or more physical meeting rooms 20 for use by meeting endpoints 4-N scheduled to be involved in the meeting session. Information such as the types of content for the meeting session, types of software applications needed to execute in order to support the content, and any other suitable types of related information associated with and relevant to the meeting are also provided by one or more participants at one or more meeting endpoints 4-N to the meeting server 40, and this information is utilized by the scheduling manager 52 to ensure the appropriate software applications are available from the content/application sharing manager 58 for use during the meeting session as well as to determine the types of work spaces that will be required (to facilitate mapping by the virtual room configuration manager 54 of content to be provided for purposes of sharing and co-creation/co-editing within the meeting session for each meeting endpoint).

The scheduling manager 52 can further be configured with one or more sets of rules (e.g., utilizing any one or more suitable algorithms) to gather information associated with a meeting session (by either requesting information from participants or being provided the information from one or more participants as previously described herein) and, based upon such gathered information, establish potential meeting times, possible software applications required for use, number and types of work spaces, etc.

When a meeting session start time has been determined (e.g., based upon one or more participants indicating an acceptance of a meeting time proposed by the meeting server 40 utilizing the scheduling manager 52), and the content to be displayed, edited, etc. is known along with software applications needed to be executed or run to facilitate such display and editing of content, and the number and types of work spaces are also known (based upon the content to be provided to the meeting and physical constraints of one or more physical meeting rooms at one or more meeting endpoints), the scheduling manager 52 provides at least some of this collected or gathered information to the virtual room configuration manager 54 so that the manager 54, at 110, can configure a virtual meeting room and also map content to be provided for the meeting to common work spaces that will be implemented for each meeting endpoint. The virtual room configuration manager 54, utilizing the avatar manager 56, also can map virtual avatars to meeting endpoints for use by participants (e.g., utilizing the one or more avatar applications 18 at a computing device 5 or other electronic device associated with one or more participants at each meeting endpoint) at this stage as well as at any other suitable time (e.g., at the initiation of the meeting session, when actual participants are known, during the meeting session, etc.).

At 120, an online collaborative meeting session is initiated. The meeting session can be initiated automatically by the meeting server 40 utilizing the scheduling manager 52 to contact all meeting endpoints scheduled for the meeting session. Alternatively, the meeting can be initiated by each meeting endpoint logging into the meeting platform, including connecting with the meeting server 40, and selecting an option to engage in the meeting session. Whether the meeting server 40 or the meeting endpoints initiate the meeting session, the actual meeting can be suspended until designated essential participants are determined to be engaged within the meeting session. Participants can be identified by the scheduling manager 52 as being within a physical meeting room 20 based upon detection utilizing one or more of the participant sensors 29 as described herein. Other participants at remote meeting endpoints can be identified by the scheduling manager 52 as being engaged in the meeting session by a computing device identified as being associated with a meeting person being determined as being engaged in the meeting session.

At the initiation of the meeting session, the virtual room configuration manager 54 provides information to the physical meeting rooms 20 regarding lighting, configuration of the electronic devices defining the work spaces 22 (e.g., whether each electronic device need be moved or rotated to a particular position), as well as any other suitable information relevant to the meeting. Content associated with the meeting session is mapped to the electronic devices within the meeting rooms 20 for display and editing in the manner as described herein, while the virtual meeting room is provided to remote meeting endpoints for interactive use by participants (via their interactive avatars) at remote endpoints as described herein. Optionally, the virtual meeting room can also be accessible for interactive use by participants (via their virtual avatars) at physical meeting rooms 20. For example, a thin client device 24 or other computing device within a physical meeting room 20 can display the virtual meeting room within the meeting session for interactive use by one or more participants.

At 130, the participants at meeting endpoints engage in the online collaborative meeting session, and the meeting server 40 facilitates sharing, co-creation, and co-editing of content at each of the plurality of work spaces, where manipulation and editing of content can occur at any meeting endpoint (with any change in content being translated in real-time to the corresponding or common work spaces at other meeting endpoints).

Referring to FIG. 7, an example embodiment of different meeting endpoints engaged in an online collaborative meeting session is schematically depicted, in which two physical meeting rooms 20-1 and 20-2 and two remote meeting endpoints operating with computing devices 5-1 and 5-2 are currently engaged in the meeting session. It is noted that the number of meeting endpoints depicted in FIG. 7 is for ease of illustration, and that the meeting session could also include any suitable number of additional meeting endpoints. The configuration of tables and other furniture and cameras as well as electronic devices used to define work spaces in the physical meeting rooms 20-1 and 20-2 is similar so as to provide the simulation to participants that everyone within the meeting session is within the same room. Similarly, the virtual meeting room 57 that is displayed by computing devices 5-1 and 5-2 for viewing and interactive use by participants at the remote meeting endpoints has a configuration that is substantially similar to the configuration of each physical meeting room 20-1, 20-2, including the location and positioning of work spaces within the virtual meeting room 57.

At least one meeting server 40 provides a virtualization service 59 to all meeting endpoints so as to synchronize manipulation or editing of content occurring at a work space by a participant at any meeting endpoint such that such edited content is translated, distributed to and displayed by the corresponding or common work space located at all the other meeting endpoints. Software applications required to display and edit content at work spaces (e.g., CAD programs, word processing programs, spreadsheet programs, slide presentation programs, etc.) are provided by the content/application sharing manager 58, where the manager 58 can store such applications or obtain the applications from any one or more suitable memory container systems (e.g., from any storage repository 60-M). Participants at the various meeting endpoints can use their corresponding virtual avatars assigned to the meeting endpoints by the virtual room configuration manager 52 to view and manipulate content within any work space and/or within the virtual room 57. For example, participants at remote meeting endpoints can utilize any suitable input devices (e.g., keyboard, mouse pad, touch screen, etc.) of computing devices 5 to control a virtual avatar within the display of the virtual meeting room in order to facilitate viewing and manipulation/editing of content in the work spaces defined within the virtual meeting room. Similarly, participants within physical meeting rooms 20 can also utilize any suitable input devices provided within such meeting rooms 20 to view and manipulate/edit content within the defined work spaces 22. Electronic devices that define work spaces 22 within physical meeting rooms 20 can be moved and/or rotated automatically by the meeting server 40 or manually by participants based upon any changes in views of content that may be required during the meeting session. Similarly, the work spaces defined in the virtual meeting room can be moved in the same manner as the work spaces defined within the physical meeting rooms.

At 140, the meeting server 40 and computing devices associated with the meeting endpoints facilitate control by participants (e.g., using their virtual avatars) in order to display different views within the virtual meeting room so as to, e.g., focus in on a particular work space and to simulate movement within the virtual meeting room in a manner similar to how a participant would move within a physical meeting room (as shown, e.g., in the embodiment of FIG. 8 previously described herein). The view within a virtual meeting room at one meeting endpoint can be different in relation to the view of the virtual meeting room at another meeting endpoint, particularly when the meeting endpoints do not include a participant that is currently presenting content within the meeting session. However, in an optional embodiment, a participant that is a presenter and is operating within the virtual meeting room within the meeting session can select to control a view (e.g., via the presenter's virtual avatar) within the virtual meeting room that is displayed by all other meeting endpoints, particularly in a scenario in which the presenter desires to show other participants some feature for a work space or something within the virtual room itself.

The meeting session can optionally be recorded by the meeting server 40, including capturing all changes made to content (e.g., original versions of content provided to the meeting spaces at the initiation of the meeting, and all versions of edited content that occurred throughout the meeting, as well as the final version of content at the termination of the meeting) and all other types of audio and/or video communications that occurred during the meeting session. At 150, an option to store the recording of the meeting session is provided. In response to one or more participants electing to store the recording, the recording is stored in one or more of the storage repositories 60-M. Stored online meeting sessions (including content provided on the work spaces associated with the meeting sessions) can be replayed by one or more participants or used in future online meetings. For example, a recorded session can be utilized in a follow-up meeting where participants may desire to pick up where the previous meeting ended, such that content associated with the work spaces that was stored at the end of the previous meeting session can be provided to the common work spaces defined at the meeting endpoints at the initiation of the next meeting session.

Thus, the systems and techniques described herein facilitate online collaborative meetings in which participants at different meeting endpoints can collaborate in the sharing, generation, and editing of content via multiple work spaces in real-time during such meetings. By configuration a virtual meeting room that is the same or similar to other physical meeting rooms at meeting endpoints associated with the meeting session and by mapping content to be provided for the meeting session to a plurality of defined work spaces, where each work space is assigned specific content and the work spaces are all common to each meeting endpoint, co-creation and co-editing of content is facilitated at multiple work spaces and in real-time by participants at multiple meeting endpoints. This enhances the collaboration experience between participants despite the fact that they may be physically remote from each other.

The above description is intended by way of example only.

What is claimed is:

1. A method comprising:
   establishing, via at least one meeting server, an online collaborative meeting comprising a plurality of separate meeting endpoints that communicate with each other via the at least one meeting server, wherein at least one meeting endpoint comprises a physical meeting room and at least one computing device operable by at least one meeting participant;
   establishing for the online collaborative meeting, via the at least one meeting server, a plurality of electronic work spaces that are commonly assigned to each meeting endpoint, wherein each work space for each meeting endpoint provides different content and each work space that is common to each meeting endpoint provides the same content for real-time display, wherein the establishing a plurality of electronic work spaces comprises:
      determining, via the at least one meeting server and based upon criteria associated with the meeting endpoints, a number of common work spaces to assign for the online collaborative meeting; and
      hosting a virtual room for display at one or more meeting endpoints including a display of the common work spaces, wherein the hosting the virtual room comprises facilitating movement within the virtual room by a visible avatar controlled by a meeting participant via a first computing device at a meeting endpoint so as to modify content at different work spaces, the visible avatar being displayed in the virtual room at each meeting endpoint, and the hosting the virtual room further comprises facilitating movement within the virtual room by an invisible avatar via a second computing device at a meeting endpoint, the invisible avatar not being displayed in the virtual room to at least another meeting endpoint, and further wherein movement of an avatar within the virtual room is restricted by at least one invisible barrier located within the virtual room so as to prevent at least a portion of the avatar from covering a work space within the virtual room;
   facilitating during the online collaborative meeting, via the at least one meeting server, modification to content at any of the work spaces by any meeting endpoint and via an avatar controlled by a computing device at the meeting endpoint, wherein modification to content at a work space by one meeting endpoint results in a real-time distribution and display of the modification to the content at the common work space at all other meeting endpoints;
   determining, via information provided by at least one sensor within the physical meeting room, a presence of at least one participant within the room; and
   based upon a detection of the presence of the at least one participant utilizing information provided by the at least one sensor, implementing an action via the at least one meeting server, the action comprising determining content or work spaces to be utilized for the online collaborative meeting.

2. The method of claim 1, wherein the establishing a plurality of electronic work spaces for the online collaborative meeting comprises:
   determining, via the at least one meeting server and based upon criteria associated with the meeting endpoints, a number of common work spaces to assign for the online collaborative meeting; and
   hosting the virtual room for display at one or more meeting endpoints including a display of the common work spaces.

3. The method of claim 2, wherein the facilitating modification to content at any of the work spaces comprises:
   facilitating access by a meeting participant and via a computing device at a meeting endpoint to the virtual room hosted by the at least one meeting server; and facilitating modification of content at any of the work spaces within the virtual room via operation of the computing device by the meeting participant.

4. The method of claim 1, wherein the method further comprises:
displaying content for at least one work space at a display within the physical meeting room; and
facilitating modification to content by a participant within the physical meeting room at the display.

5. The method of claim 4, wherein the work spaces at the physical meeting room comprise a plurality of displays, and the method further comprises:
facilitating, via automatic control by at least one of a controller within the physical meeting room and a controller at another meeting endpoint, movement of at least one display in relation to at least one other display during the online collaborative meeting.

6. The method of claim 1, further comprising:
recording the online collaborative meeting, including content provided for the online collaborative meeting at the common work spaces; and
in response to completion of the online collaborative meeting, storing audio and video communications as well as all content for common work spaces associated with the recorded online collaborative meeting.

7. The method of claim 1, further comprising:
facilitating, via an avatar controlled by a computing device at a meeting endpoint, changing a view within the virtual room for display at one or more meeting endpoints by rotating the view within the virtual room or magnifying the view within the virtual room.

8. An apparatus comprising:
a memory configured to store instructions including one or more applications that support online collaborative meetings between meeting endpoints over a network, wherein at least one meeting endpoint comprises a physical meeting room and at least one computing device operable by at least one meeting participant;
a network interface device configured to enable communications over the network; and
a processor configured to execute and control operations of the one or more applications so as to:
establish an online collaborative meeting comprising a plurality of separate meeting endpoints that communicate with each other;
establish for the online collaborative meeting a plurality of electronic work spaces that are commonly assigned to each meeting endpoint, wherein each work space for each meeting endpoint provides different content and each work space that is common to each meeting endpoint provides the same content for real-time display, wherein the establishing a plurality of electronic work spaces comprises:
determining, based upon criteria associated with the meeting endpoints, a number of common work spaces to assign for the online collaborative meeting; and
hosting a virtual room for display at one or more meeting endpoints including a display of the common work spaces, wherein the hosting the virtual room comprises facilitating movement within the virtual room by an avatar controlled by a meeting participant via a computing device at a meeting endpoint so as to modify content at different work spaces;
hosting a virtual room for display at one or more meeting endpoints including a display of the common work spaces, wherein the hosting the virtual room comprises facilitating movement within the virtual room by a visible avatar controlled by a meeting participant via a first computing device at a meeting endpoint so as to modify content at different work spaces, the visible avatar being displayed in the virtual room at each meeting endpoint, and the hosting the virtual room further comprises facilitating movement within the virtual room by an invisible avatar via a second computing device at a meeting endpoint, the invisible avatar not being displayed in the virtual room to at least another meeting endpoint, and further wherein movement of an avatar within the virtual room is restricted by at least one invisible barrier located within the virtual room so as to prevent at least a portion of the avatar from covering a work space within the virtual room;
facilitate during the online collaborative meeting modification to content at any of the work spaces by any meeting endpoint and via an avatar controlled by a computing device at the meeting endpoint, wherein modification to content at a work space by one meeting endpoint results in a real-time distribution and display of the modification to the content at the common work space at all other meeting endpoints;
determine, via information provided by at least one sensor within the physical meeting room, a presence of at least one participant within the room; and
based upon a detection of the presence of the at least one participant utilizing information provided by the at least one sensor, implement an action comprising determining content or work spaces to be utilized for the online collaborative meeting.

9. The apparatus of claim 8, wherein the processor is configured to establish a plurality of electronic work spaces for the online collaborative meeting by:
determining, based upon criteria associated with the meeting endpoints, a number of common work spaces to assign for the online collaborative meeting; and
hosting the virtual room for display at one or more meeting endpoints including a display of the common work spaces.

10. The apparatus of claim 9, wherein the processor is configured to facilitate modification to content at any of the work spaces by:
facilitating access by a meeting participant and via a computing device at a meeting endpoint to the virtual room hosted by the at least one meeting server; and
facilitating modification of content at any of the work spaces within the virtual room via operation of the computing device by the meeting participant.

11. The apparatus of claim 8, wherein the processor is further configured to:
display content for at least one work space at a display within the physical meeting room; and
facilitate distribution of content modified by a participant within the physical meeting room at the display to other meeting endpoints during the online collaborative meeting.

12. The apparatus of claim 11, wherein the work spaces at the physical meeting room comprise a plurality of displays, and the method further comprises:
facilitating, via automatic control by at least one of a controller within the physical meeting room and a controller at another meeting endpoint, movement of at least one display in relation to at least one other display during the online collaborative meeting.

13. The apparatus of claim 8, wherein the processor is further configured to:
   record the online collaborative meeting, including content provided for the online collaborative meeting at the common work spaces; and
   in response to completion of the online collaborative meeting, store audio and video communications as well as all content for common work spaces associated with the recorded online collaborative meeting.

14. One or more computer readable storage media comprising one or more hardware devices encoded with software comprising computer executable instructions and when the software is executed operable to:
   establish, via at least one meeting server, an online collaborative meeting comprising a plurality of separate meeting endpoints that communicate with each other via the at least one meeting server, wherein at least one meeting endpoint comprises a physical meeting room and at least one computing device operable by at least one meeting participant;
   establish for the online collaborative meeting, via the at least one meeting server, a plurality of electronic work spaces that are commonly assigned to each meeting endpoint, wherein each work space for each meeting endpoint provides different content and each work space that is common to each meeting endpoint provides the same content for real-time display, wherein the establishing a plurality of electronic work spaces comprises:
      determining, via the at least one meeting server and based upon criteria associated with the meeting endpoints, a number of common work spaces to assign for the online collaborative meeting; and
      hosting a virtual room for display at one or more meeting endpoints including a display of the common work spaces, wherein the hosting the virtual room comprises facilitating movement within the virtual room by a visible avatar controlled by a meeting participant via a first computing device at a meeting endpoint so as to modify content at different work spaces, the visible avatar being displayed in the virtual room at each meeting endpoint, and the hosting the virtual room further comprises facilitating movement within the virtual room by an invisible avatar via a second computing device at a meeting endpoint, the invisible avatar not being displayed in the virtual room to at least another meeting endpoint, and further wherein movement of an avatar within the virtual room is restricted by at least one invisible barrier located within the virtual room so as to prevent at least a portion of the avatar from covering a work space within the virtual room;
   facilitate during the online collaborative meeting, via the at least one meeting server, modification to content at any of the work spaces by any meeting endpoint and via an avatar controlled by a computing device at the meeting endpoint, wherein modification to content at a work space by one meeting endpoint results in a real-time distribution and display of the modification to the content at the common work space at all other meeting endpoints;
   determining, via information provided by at least one sensor within the physical meeting room, a presence of at least one participant within the room; and
   based upon a detection of the presence of the at least one participant utilizing information provided by the at least one sensor, implementing an action via the at least one meeting server, the action comprising determining content or work spaces to be utilized for the online collaborative meeting.

15. The computer readable storage media of claim 14, wherein the instructions are operable to establish a plurality of electronic work spaces for the online collaborative meeting by:
   determining, via the at least one meeting server and based upon criteria associated with the meeting endpoints, a number of common work spaces to assign for the online collaborative meeting; and
   hosting the virtual room for display at one or more meeting endpoints including a display of the common work spaces.

16. The computer readable storage media of claim 15, wherein the instructions are operable to facilitate modification to content at any of the work spaces by the computing device by:
   facilitating access by a meeting participant and via a computing device at a meeting endpoint to the virtual room hosted by the at least one meeting server; and
   facilitating modification of content at any of the work spaces within the virtual room via operation of the computing device by the meeting participant.

17. The computer readable storage media of claim 14, wherein the instructions are further operable to:
   display content for at least one work space at a display within the physical meeting room; and
   facilitate modification to content by a participant within the physical meeting room at the display.

18. The computer readable storage media of claim 17, wherein the work spaces at the physical meeting room comprise a plurality of displays, and the instructions are further operable to:
   facilitate, via automatic control by at least one of a controller within the physical meeting room and a controller at another meeting endpoint, movement of at least one display in relation to at least one other display during the online collaborative meeting.

19. The computer readable media of claim 14, wherein the instructions are further operable to:
   record the online collaborative meeting, including content provided for the online collaborative meeting at the common work spaces; and
   in response to completion of the online collaborative meeting, store audio and video communications as well as all content for common work spaces associated with the recorded online collaborative meeting.

* * * * *